US007052393B1

(12) United States Patent
Schoen

(10) Patent No.: US 7,052,393 B1
(45) Date of Patent: May 30, 2006

(54) TECHNIQUE TO CREATE TARGETED LOTTERY SYSTEMS USING ELECTRONIC MEDIA INTERFACES

(76) Inventor: Neil C. Schoen, 9817 Freestate Pl., Gaithersburg, MD (US) 20879

( * ) Notice: Subject to any disclaimer, the term of this patent is extended or adjusted under 35 U.S.C. 154(b) by 0 days.

(21) Appl. No.: 09/296,864

(22) Filed: Feb. 17, 1998

Related U.S. Application Data

(63) Continuation-in-part of application No. 08/619,984, filed on Mar. 21, 1996, now abandoned.

(51) Int. Cl.
*A63F 13/00* (2006.01)

(52) U.S. Cl. .......................................................... 463/17

(58) Field of Classification Search .................. 705/14, 705/16, 24, 35, 500; 235/380; 273/138.1, 273/139; 463/16–22, 25; 345/214
See application file for complete search history.

(56) References Cited

U.S. PATENT DOCUMENTS 4,398,708 A * 8/1983 Goldman et al. ........ 273/138.1
4,764,666 A * 8/1988 Bergeron ................. 273/138.1
4,832,341 A * 5/1989 Muller et al. ............ 273/138.1
4,953,895 A * 9/1990 Goussios ................. 273/138.1
4,993,714 A * 2/1991 Golightly ................. 273/138.1
5,353,219 A * 10/1994 Mueller et al. ............... 705/16
5,620,182 A * 4/1997 Rossides .................. 273/138.1
6,028,920 A * 2/2000 Carson .................... 379/114.2
6,105,009 A * 8/2000 Cuervo ........................ 705/43

* cited by examiner

*Primary Examiner*—Louis K. Huynh
*Assistant Examiner*—John Paradiso

(57) ABSTRACT

A system to encode lottery numbers onto magnetic strip cards used as fare cards for public transportation systems. The system is activated by user selection of a lottery option and increased payment at the time of the fare card purchase, or altered after purchase in a separate hardware system. A second unit determines those cards that will be selected for payout (e.g., winning cards). The system is designed to provide additional revenue to replace/reduce government subsidization of public transportation, by collecting additional revenues from that portion of the population that uses the transportation system and opts to participate in the lottery. Most services provided by an electronic media interface (e.g., fare card, credit card, ticket, computer modem, etc.) can be modified to provide this targeted lottery feature.

4 Claims, 6 Drawing Sheets

TECHNIQUE TO CREATE TARGETED LOTTERY SYSTEMS USING ELECTRONIC MEDIA INTERFACES

This application is a continuation-in-part, Ser. No. 08/619,984, filed Mar. 21, 1996, now abandoned.

BACKGROUND

Lottery systems have become commonplace, as a result of changes in state laws, which has led to proliferation of outlets at which one can purchase lottery tickets. Currently, many state and local governments now offer lottery purchases via machines at freeway stops, commercial enterprises (e.g., local grocery stores, tobacco shops, etc.) as well as at state/local government sponsored outlets. The present lottery distribution systems lack specificity for targeting resources to users of state systems, such as transportation and health care, for example; they depend on government allocation of general lottery revenues.

The present invention allows lottery revenues to be collected from the users of these state/local services, which typically are subsidized by tax revenues, and always in need of additional resources. With the advent of electronic fare/collection systems, the opportunity to selectively access the user population now exists. The application of this new technology to provide additional resources to state and local services via lottery processes will be described in this patent specification and associated claims.

SUMMARY OF THE INVENTION

The substance of the present invention is to allow a user-selected lottery option with minimal perturbations to the cost and efficiency of operation of currently established service delivery systems. This description will focus on modern metro-rail transportation, but this concentration is not intended to limit the scope of this invention.

The essential innovation is the selection and encoding of a random number sequence on the magnetic/electronic media (e.g., fare card). When the media is presented to a redemption device, the encoded random number can be checked against selected winning numbers to determine if a particular media article presented for redemption is a winning item. Depending upon the traffic volume, options for user-selected sequences can be provided, but will slow down the system throughput since the purchaser will require more time to manually select a number.

Another key feature of the present invention is the ability to work with existing systems with minimum modifications. Current magnetic strip fare card machines have the ability to encode time, location and monetary values as part of the process of automatically recording the change in fare card value based on the entry/exit locations and the time of the day (the Washington D.C. metro-rail system is a good example). A simple modification to the fare purchase hardware system can enable additional funds to be collected for a lottery option and a suitable code number to be written on the fare card magnetic strip. Redemption of the fare cards can be accomplished after exit at separate machines, at the traveler's convenience (so as not to delay travelers not using the lottery option).

This invention is not limited to magnetic fare card systems. Any system that requires a ticket or card can be adapted for lottery use. For example, parking lot tickets, credit cards, show tickets or any system that collects cash in exchange for a receipt can be modified according to this invention.

DETAILED DESCRIPTION OF PREFERRED EMBODIMENTS

One of the most suitable government systems for implementing a lottery option is the modern metro-rail system (such as those in Washington, D.C. and San Francisco, Calif.). A description of the invention tailored to this type of transportation system is as follows.

Figure 1:
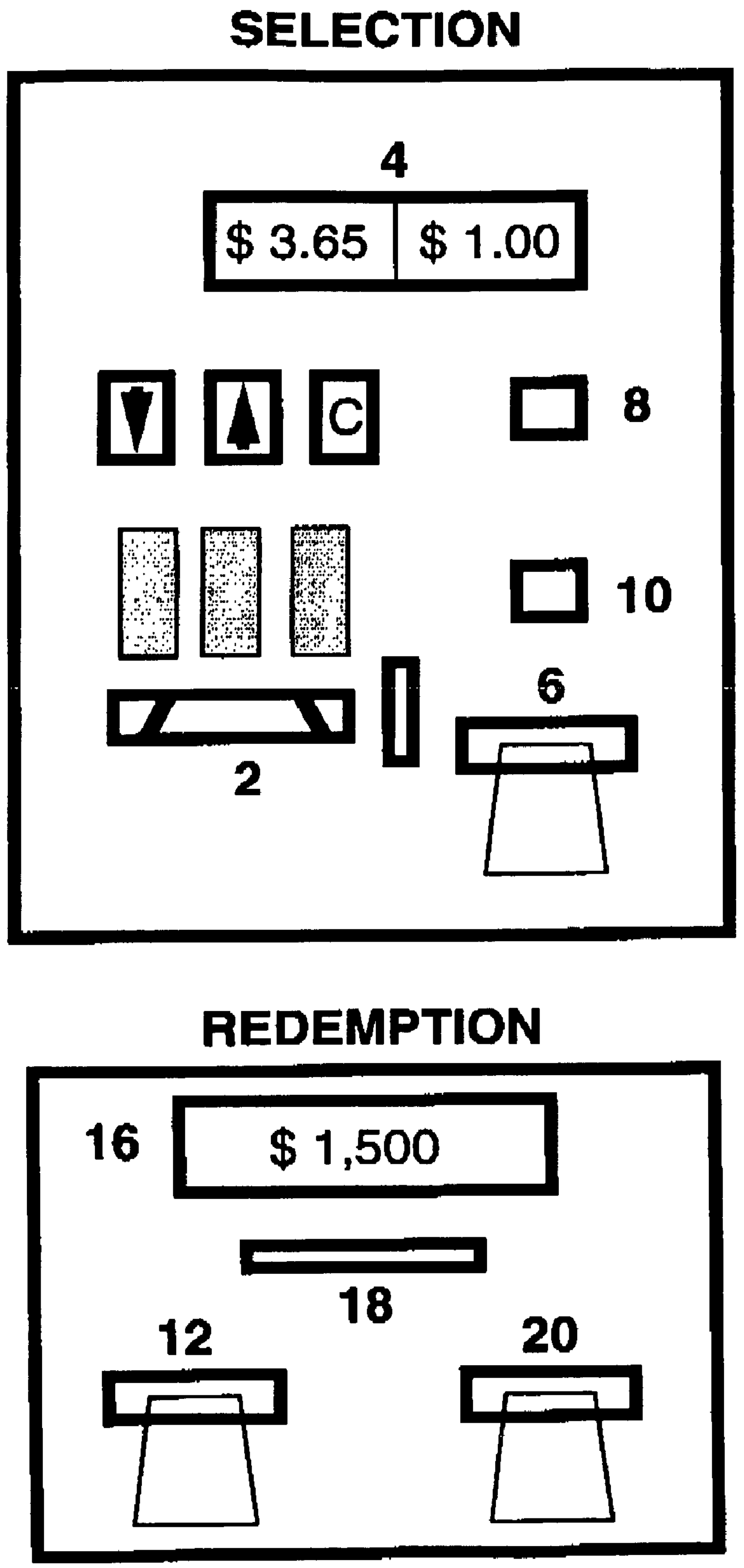
FIG. 1 shows selection and redemption methods for magnetic fare card systems with a separate redemption machine that interrogates fare cards after the holder exits the destination station.

FIG. 1 shows a schematic diagram of a current metro-rail fare card selection system, as modified to provide a lottery feature according to this invention. A mechanical device 2 accepts money (bills/coins) currently set up to create a credit balance against which transportation costs are deducted. The amount of money entered appears on an LED display 4. Normally the transaction complete button 10 is pushed and a fare card is issued with the designated credit, and is ejected from the machine by a slot 6. The device is modified to provide a lottery option button 8 which when pushed allows additional money to be inserted to be credited toward the lottery purchase, which is entered when the transaction complete button 10 is pushed. The cared is ejected via device slot 6 as before. Only this card now can have a lottery number encoded, along with the information on the amount of additional money added for the lottery wager.

In normal use, the card is inserted in a "turnstile" type machine at the entry and exit stations, and the appropriate fare is deducted and the fare card returned with the new credit balance, based on the entry and exit station and time of day (for rush hour/non-rush hour charges). One variant of the present invention involves a separate redemption machine(s) (located at all stations) which would accept fare cards after the user has exited the station "turnstile" machine. As shown in FIG. 1, the redemption machine has a card reader 12 similar to the selection machine reader/exit device 6, but has an additional feature of returning a winning ticket receipt 18 (if appropriate) as well as a deactivated card return 20. The winning amount is shown on a display LED 16.

Figure 2:
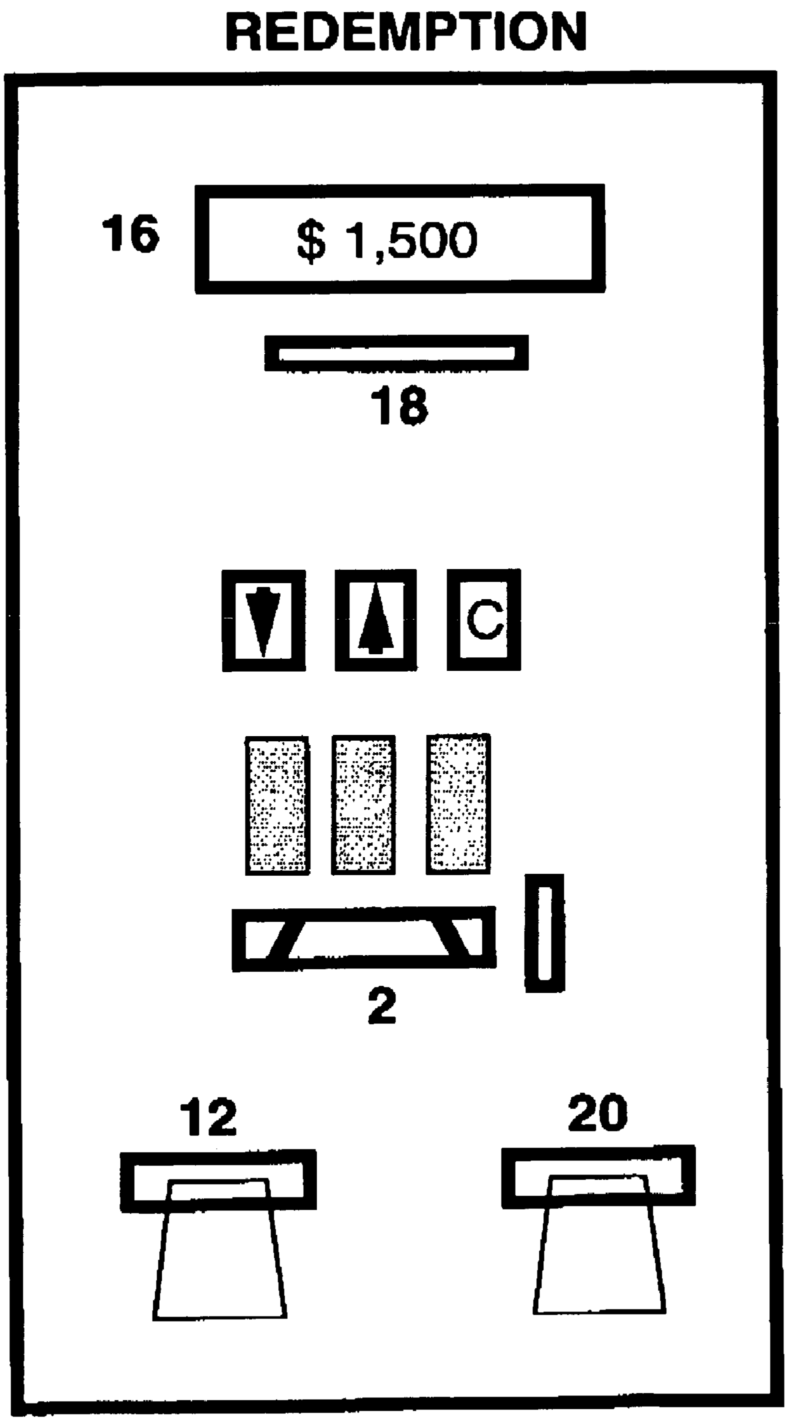
FIG. 2 illustrates an optional configuration in which the holder can select a lottery option after exiting the destination station by adding cash and redeeming at that same machine, which utilizes a random selection process based on the number of players registered (similar to a slot machine pay-off based on traffic history).

An alternative configuration would not need a special selection modification, as shown in FIG. 1 by the lottery option button 8, but would accomplish the lottery selection at the redemption machine, as shown in FIG. 2. Thus, no modification of the fare card is necessary, and winners are selected at the redemption machine based on a frequency formula similar to those used in slot machines.

Figure 3:
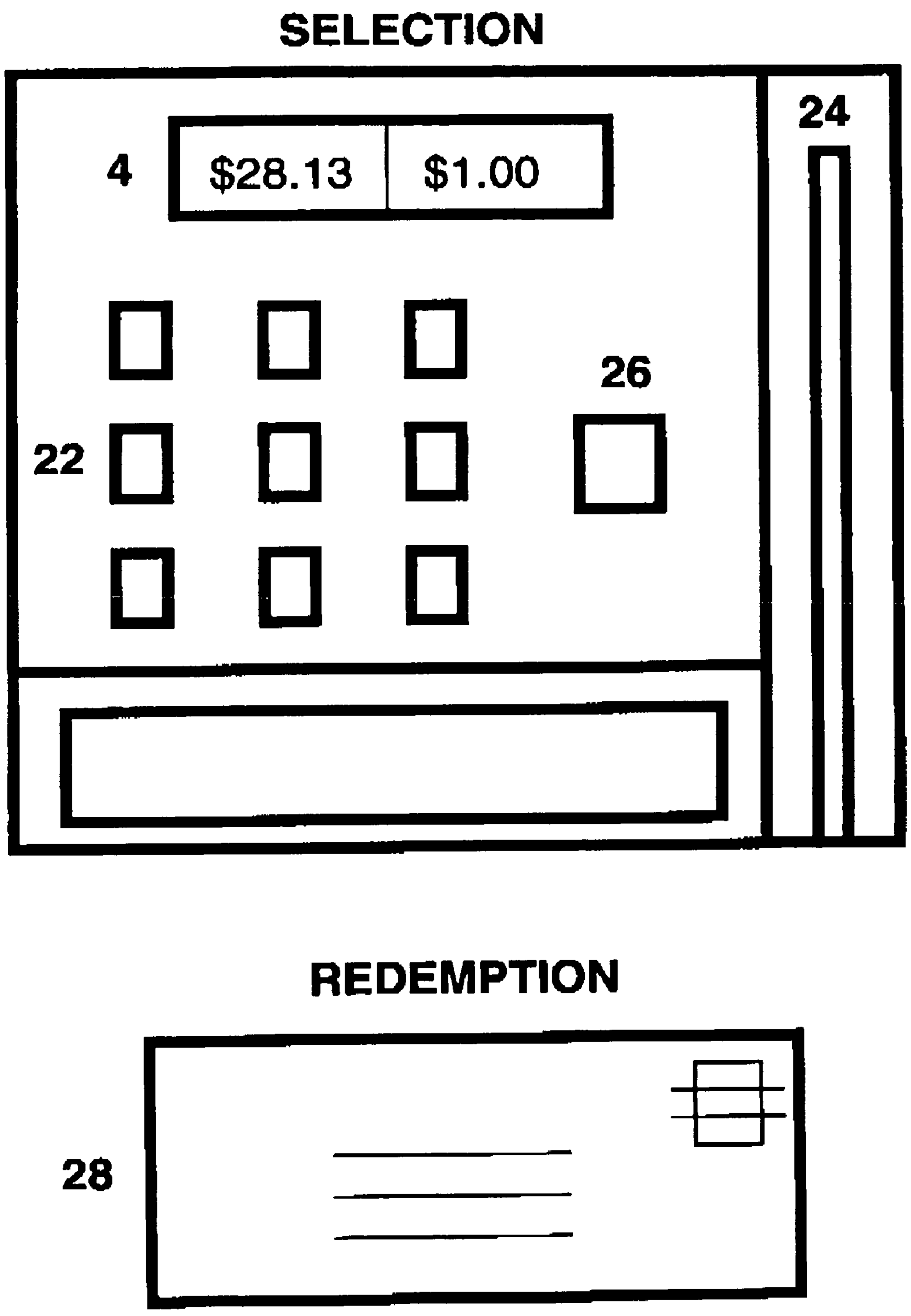
FIG. 3 shows a selection and redemption method for credit card purchases at a cash register type device, with a redemption system using mail notification based on the number of players.

Another variant of this invention can be used on credit card transactions, as shown in FIG. 3. A typical credit card entry machine (with magnetic reader "swipe slot" 24) and keyboard entry system 22 is shown as currently fielded (or as part of a more complex cash register feature found in department stores). A separate lottery option button 26 is pushed (or a sequence of normal numeric buttons to identify a lottery selection) to indicate the user has elected to make a wager. A random code sequence is appended to the entry which is used for selection of winning wagers. This selection of winners can be done at a central billing site, and the winners notified by mail 28.

Figure 4:
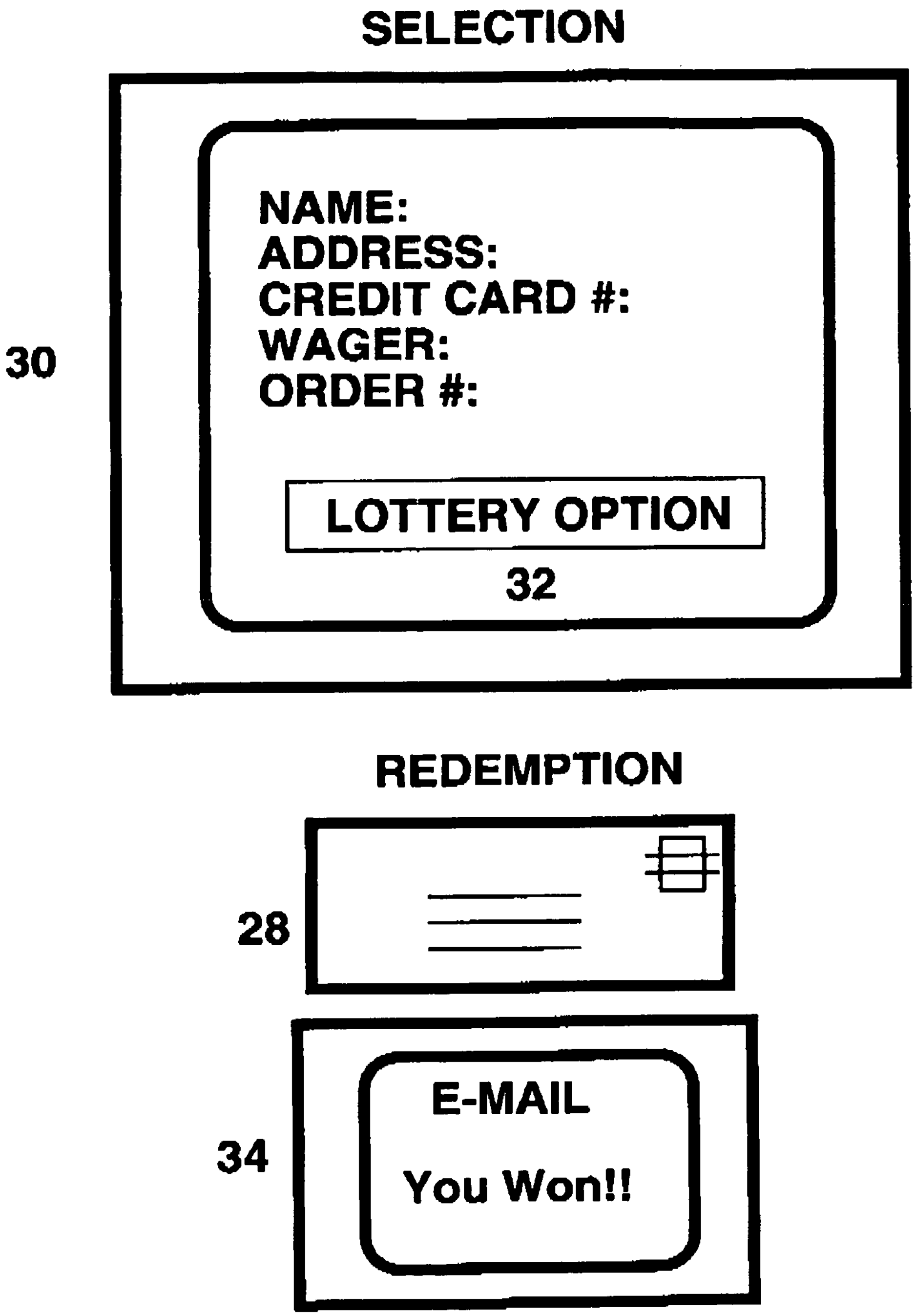
FIG. 4 shows a selection and redemption system based on computer purchases, with redemption accomplished by computer e-mail or mail notification.
Figure 5:
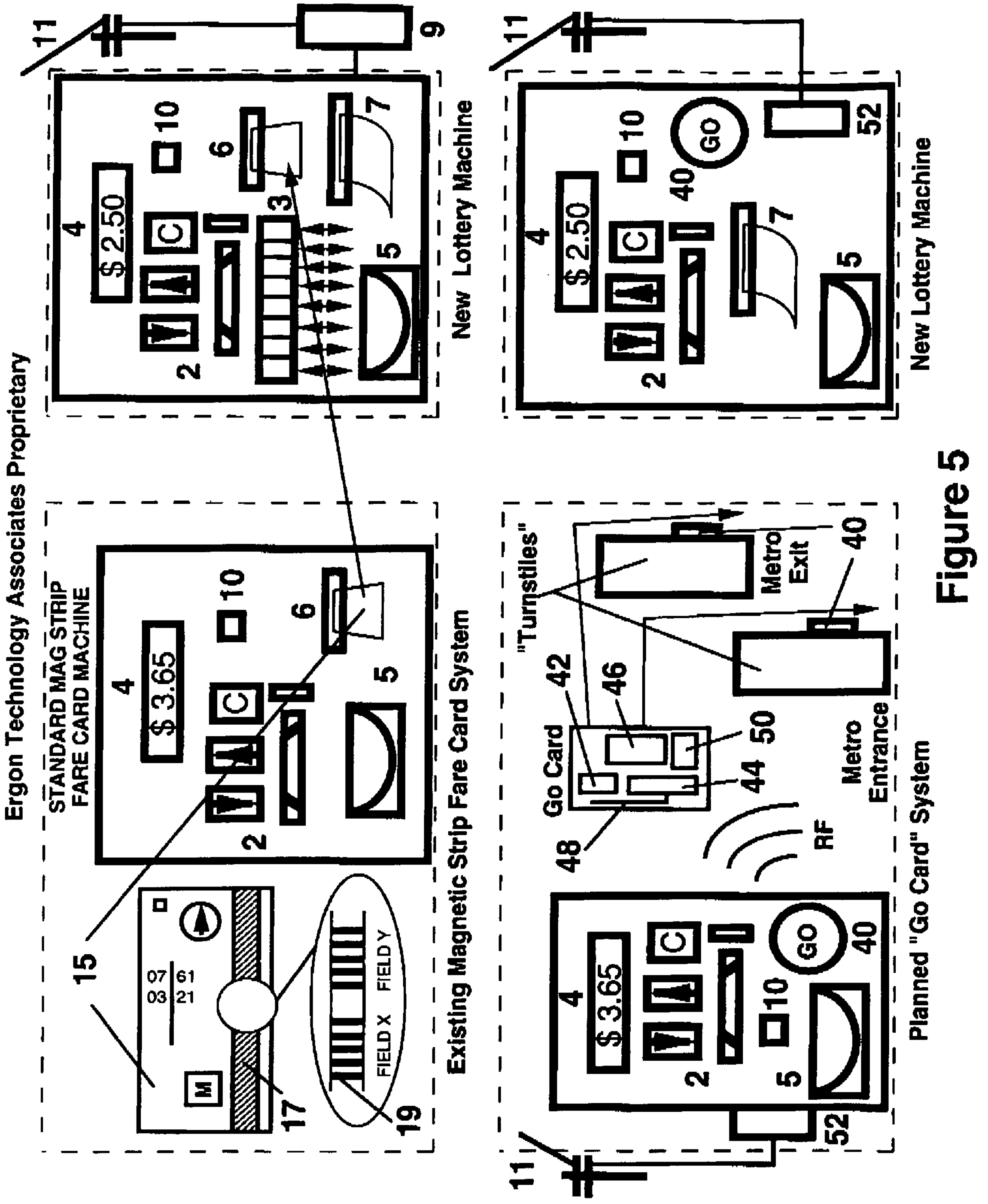
Figure 6:
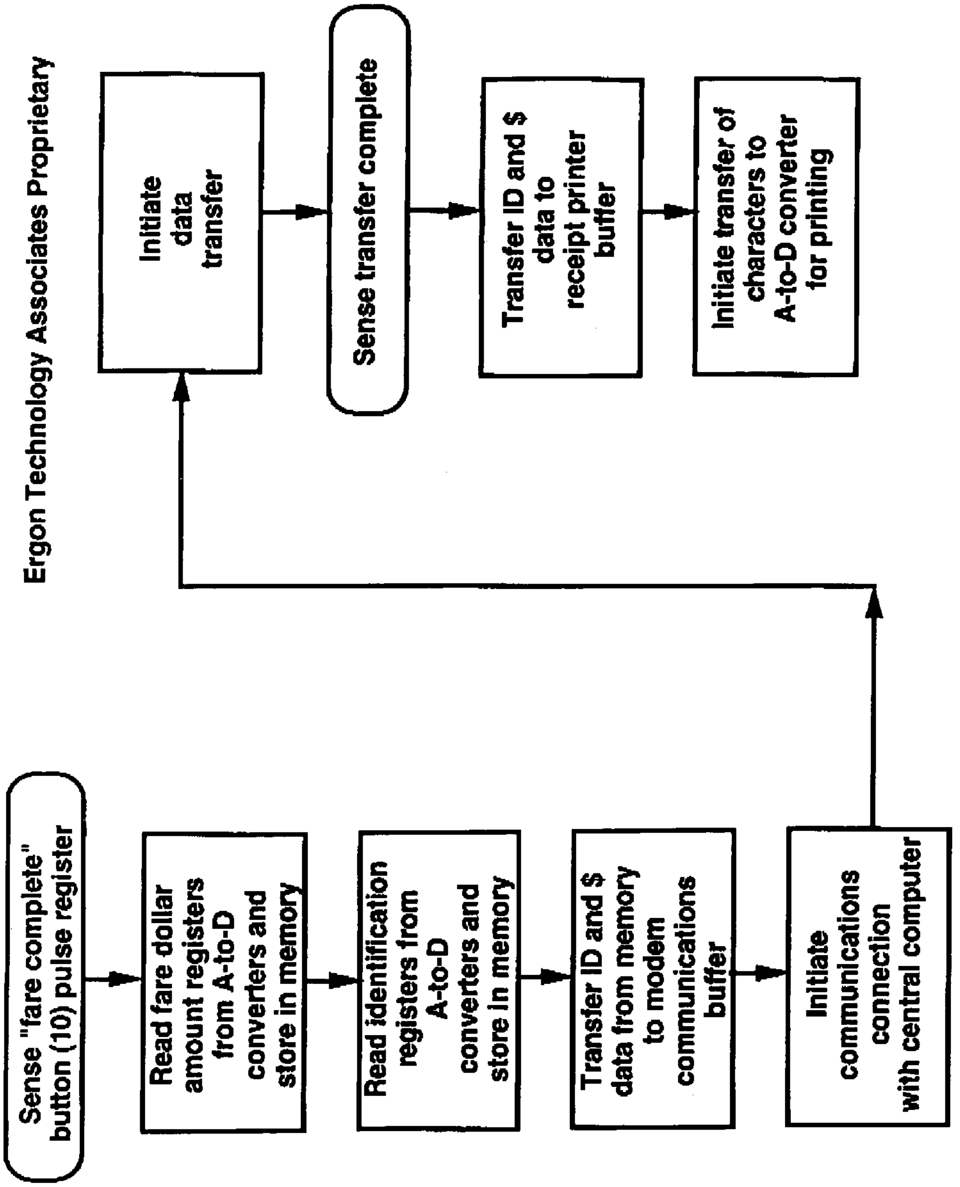

A third configuration or variant can be set up when the entry device is a computer 30 on a network, as shown in FIG. 4. The hardware and software is modified to display a lottery option button 32 and wager amount, before the data is forwarded to the merchant. A similar coding process is used to identify a wager with a unique code sequence. Winning entries can be selected at a central site, and winners notified by E-mail 34 or letter 28.

It should be noted that similar methods can be used to introduce lottery options to systems involving ticket purchases (movies, shows, etc.) and other transaction systems, and the systems described above are not intended to limit the scope of this invention.

What is claimed is:

1. A system to increase revenues paid to mass transit service organizations by addition of electronic lottery processes and operations, which may collect additional revenues from customers for said lottery operations, above and beyond those paid for normal services, comprising:

means for electronically identifying and redeeming farecards which contain modifications provided for additional wager and customer identifications information for lottery operation to provide predetermined payouts to winning lottery customers;

means to collect said additional revenues from customers of said lottery operations;

means to ensure the security and integrity of said lottery processes and operations to prevent fraudulent use of invoicing media to obtain said payouts of lottery funds;

wherein said mass transit service organizations consist of metro-rail systems or other mass transit systems;

and wherein the means for electronically identifying and redeeming farecards is chosen from the following group:

a.) the "add-fare" feature on existing farecard systems with an additional ticket marking indicating a lottery purchase, which is activated by an additional lottery selection button incorporated into said farecard system;

b.) the "cash-back" feature on existing metro-rail farecard purchase machines adapted to detect an additional ticket marking indicating a lottery purchase, with fixed or programmed payouts by said adapted machine in the form of cash or, alternatively, in the form of new fare cards of the appropriate value.

2. A system according to claim 1 wherein said mass transit service organizations include auxiliary mass transit service systems.

3. A system according to claim 2 wherein the auxiliary mass transit service systems comprise parking lots, passenger rental cars, and passenger-destination-location alternative mode transportations services means.

4. A system according to claim 1 wherein said farecards include other equivalent invoicing media.

* * * * *